Oct. 10, 1939.   R. A. STEVENSON   2,175,414
PIPE THREAD PROTECTOR
Filed Feb. 12, 1938
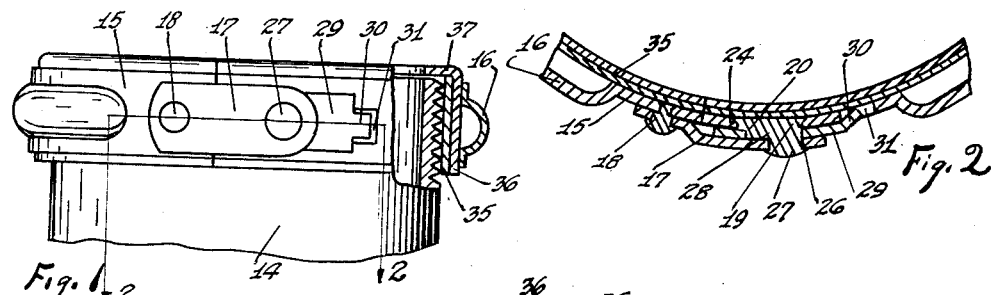
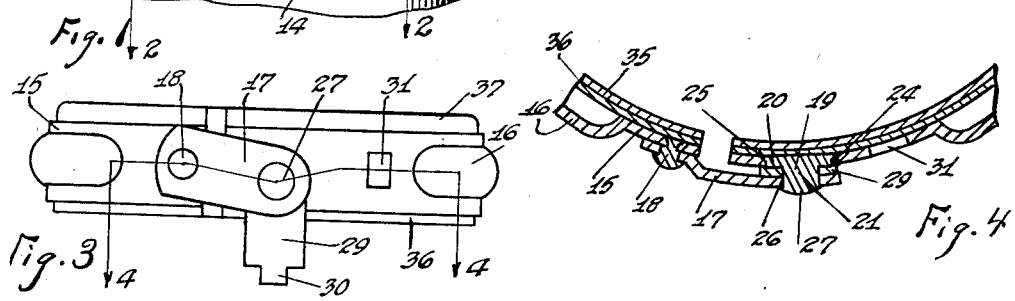
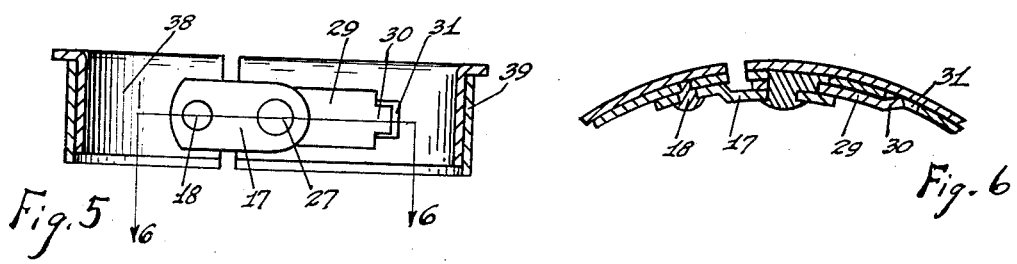
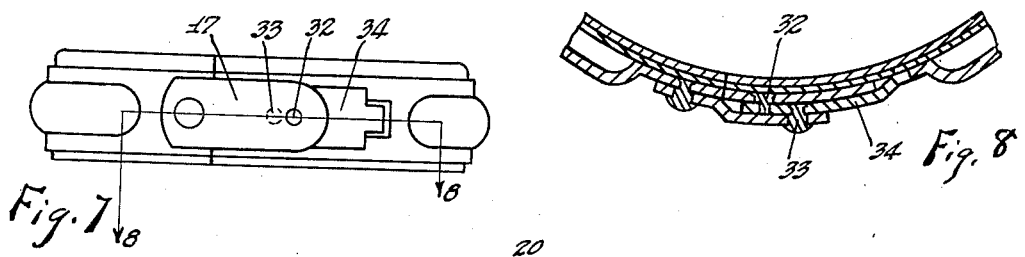
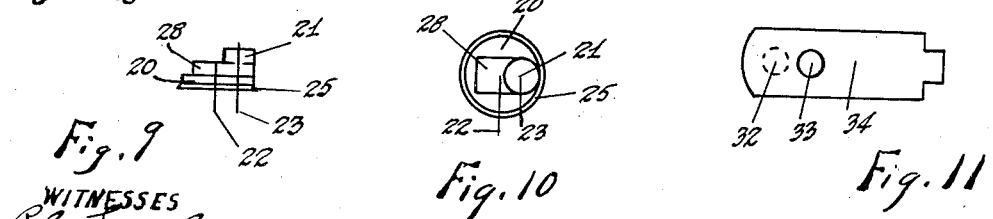
WITNESSES
INVENTOR.
Russell A. Stevenson.

Patented Oct. 10, 1939

2,175,414

UNITED STATES PATENT OFFICE 2,175,414

PIPE THREAD PROTECTOR

Russell A. Stevenson, Pittsburgh, Pa.

Application February 12, 1938, Serial No. 190,184

3 Claims. (Cl. 138—96)

This invention relates to a device for protecting the ends of pipe and pipe threads against damage or distortion when being shipped and handled.

It is one of the objects of this invention to provide an improved form of protector that can be readily placed in position on the end of the pipe and held securely thereon.

Another object of this invention is to provide a protector having a novel means for tightening it onto the end of the pipe.

The construction of the protector is such that it may be readily and economically formed from metal stamping and thus the cost, which is a very important object in protectors of this character, will be low and the protector will be efficient.

Other objects and advantages of this invention will be apparent from the following descriptions taken in connection with the accompanying drawing, of which:

Fig. 1 is a partial section showing the device applied to the threaded end of a pipe;

Fig. 2 is an enlarged fragmentary section on line 2—2 of Fig. 1;

Fig. 3 is a view similar to Fig. 1 but shows the protector in an open position.

Fig. 4 is an enlarged fragmentary section on line 4—4 of Fig. 3;

Fig. 5 is a section showing a form of the invention designed for internal threaded ends of pipe;

Fig. 6 is an enlarged fragmentary section on line 6—6 of Fig. 5;

Fig. 7 is a view of a modification of this invention;

Fig. 8 is an enlarged fragmentary section on line 8—8 of Fig. 7;

Fig. 9 is a view of the tightening member which may be employed in the structure;

Fig. 10 is a plan view of Fig. 9;

Fig. 11 is a modification of the tightening member.

Referring to the drawing 14 represents a portion of a threaded pipe end, which is shown for the purpose of illustrating the application of the invention. 15 designates an outer member formed from a strip of material into a collar having disjoined ends, and the central portion is provided with a beaded or raised portion 16 for protecting the tightening mechanism during the shipping and handling of the pipe.

Across the disjoined ends of the collar 15 is placed a swinging connecting member 17, one end of which is loosely mounted to one end of the collar 15 by a shouldered rivet 18. The opposite end of the member 17 is held in position on the opposite end of the collar 15 by a revolvable element 19. The element 19 comprises circular members 20 and 21, the center of each being spaced apart as in Figs. 9 and 10 and designated as 22 and 23. The spacing apart is means to provide a fulcrum so that when the element is rotated in one direction, the ends of the collar 15 will be drawn together and reversing the rotation of the element, the ends of the collar will be forced apart.

The inner member 20 engages in an opening 24 in the collar 15 and is prevented from being disengaged therefrom by a flange or head 25 on the inner end thereof. The outer circular member 21 engages in an opening 26 in one end of the connecting member 17 and the outer end of member 21 is provided with a head or flange 27 to prevent the disengagement therefrom.

The element 19 is provided with a rectangular portion 28 over which is placed one end of an operating arm 29 so that the element may be rotated into an operative or tightened position and rotated into an inoperative or loosened position. One end of the arm 29 is provided with a tongue 30 and an opening 31 is provided in the collar 15 into which the tongue 30 will engage for securely holding the arm 29 to prevent the rotation of the element 19.

Another way of practicing the invention is illustrated in Figs. 7, 8, and 11 which is the same as previously described, but instead of the element being of one piece and the operating arm placed over the element, the circular members 32 and 33 are fastened directly to the operating arm 34.

In addition to the outer collar 15 the present protector is provided with a suitable thread-engaging element 35 of a yielding material so that it may be pressed somewhat against the threads, thus offering frictional resistance to its movement.

Surrounding the thread-engaging element is a member 36 for mounting the thread-engaging element thereon. The one edge of the member 36 is provided with an inturned edge 37 so as to engage the end of the pipe as shown in Fig. 1.

In Fig. 5 the collar is designated as 38 and the thread-engaging element as 39. The rest of the device is the same as above described.

It can be seen from the above that when the protector is placed in position on the threads to be protected, the rotation of the element 19 through the arm 34 will move the ends of the collar 15 together causing the thread-engaging member to be embedded firmly into the threads securing the protector in an effective protective position.

When it is desired to remove the protector from its protecting position, the tongue 30 is to be raised out of the opening 31 and the element 19 rotated, which will relieve the tension on the threads and spread the ends of the collar 15, permitting the protector to be easily removed from the pipe.

In Figs. 5 and 6 the invention is shown adapted to protect the threads on the inside of the pipe and the thread-engaging element is made to fit on the outside of the protector and engage with the internal threads of the pipe. The expanding and contracting elements are the same as previously described except being mounted on the inside of the protecting ring instead of the outside.

While I have shown and disclosed but one unit on each collar, it is to be understood that one or more may be used according to the width of the protector required.

A perfect embodiment of the invention has been illustrated and described herein. It will be understood that the invention is capable of various modifications and adaptations within the scope of the appended claims.

I claim:

1. In a pipe thread protector, a collar having disjoined ends, a swing plate mounted across the ends thereof, one end of said plate being loosely mounted to one end of said collar, the opposite end of said plate and the opposite end of said collar being connected by a rotatable element having cam portions having spaced apart axes, one of said cam portions being loosely mounted in said plate and the other of said cam portions being loosely mounted in said collar including means for securing said element from rotating when the protector is in an effective holding position.

2. In a pipe thread protector, having a thread engaging element within a collar having disjoined ends, a swing plate mounted across the ends thereof, one end of said plate being loosely mounted to one end of said collar, the opposite end of said plate and the opposite end of said collar being connected by a rotatable element having pivot portions having spaced apart axes, one of said pivot portions being loosely mounted in said plate and the other of said pivot portions being loosely mounted in said collar, said element to be rotated about an axis which is perpendicular to the axis of said pipe, including means for preventing said element from rotating when the protector is tightened on the pipe.

3. In a pipe thread protector, having a thread engaging element surrounding a collar having disjoined ends, a swing plate mounted across the said ends, one end of said plate being loosely mounted to one end of said collar, the opposite end of said plate and the opposite end of said collar being connected by a rotatable element having pivot portions having spaced apart axes, one of said pivot portions being loosely mounted in said plate and the other of said pivot portions being loosely mounted in said collar, said element to be rotated about an axis which is perpendicular to the axis of said pipe, one end of said rotatable element to engage with means on the collar to prevent the rotation of said element when the protector is tightened on the pipe.

RUSSELL A. STEVENSON.